No. 730,462. Patented June 9, 1903.

UNITED STATES PATENT OFFICE.

EDWARD D. KENDALL, OF BROOKLYN, NEW YORK.

PROCESS OF TREATING ORES.

SPECIFICATION forming part of Letters Patent No. 730,462, dated June 9, 1903.

Application filed March 26, 1902. Serial No. 100,137. (No specimens.)

*To all whom it may concern:*

Be it known that I, EDWARD D. KENDALL, a citizen of the United States, residing in the borough of Brooklyn, in the city and State of New York, (and whose post-office address is No. 33 Lincoln road, in said borough,) have invented new and useful Improvements in Processes of Treating Ores, of which the following is a specification.

This invention relates to processes for obtaining gold and silver from ores by lixiviation; and the object of my invention is to render magnetite or magnetic oxid of iron, and particularly so-called "black sand," which is a magnetic oxid of iron, amenable to such treatment. As pulverized massive magnetite may be regarded as of the same nature as the said black sand, I will use herein the word "magnetite" in referring to either or both.

It is well known that an alkali-metal cyanid or chlorin in aqueous solution are ineffective as leaching agents for auriferous magnetite, which is practically impermeable by liquid; but by my herein-to-be-described process the chemical and physical characters of the magnetite are so changed that it becomes practicable to leach the same with water charged with chlorin or bromin to obtain the gold or with a solution of cyanid to extract either gold or silver or both metals.

In carrying out my invention I first separate the magnetite from any accompanying silicious and non-auriferous sand by means of any of the well-known forms of magnetic separators. I mix this concentrated magnetite with a proportionate quantity—say two or three times as much by weight—of granulated or pulverized iron pyrite, particularly auriferous pyrite, commingling the two bodies as throughly as practicable. This mixture of magnetite and pyrite I subject to heat—the temperature may be somewhat lower or it may be higher than a red heat—in any of the well-known and suitable forms of retorts, crucibles, or furnaces without admission and oxidizing action of air. Under these conditions a portion of the sulfur of the pyrite combines with the oxygen of the magnetite and another portion of sulfur combines with iron of the magnetite, a corresponding quantity of the pyrite or iron disulfid being reduced to lower iron sulfid or iron sulfids and the magnetite being converted, to a greater or less extent, into iron sulfid or iron sulfids. Special tests made in order to determine the nature of the chemical reactions which occur during the above-described part of my process indicated that the products at this stage of the process consist of two iron sulfids—viz., iron monosulfid, (FeS,) and magnetic iron sulfid, ($Fe_3S_4$,)—a comparatively small part of the magnetite, ($Fe_3O_4$,) being reduced to and remaining as iron monoxid, (FeO,) another small portion of the magnetite remaining unchanged in character. The proportionate quantity of which unchanged magnetite may vary with the degree of pulverization of the same, the period of subjection to heat and the degree of heat, the relative quantity of iron pyrite, and the intimacy of the mixture of the magnetite with the pyrite. Having continued the heating for a sufficient length of time under the conditions above mentioned while still maintaining the high temperature, I now admit air or subject the mass of mixed sulfids to a thorough so-called "oxidizing-roast," the effect of which is to convert all iron sulfid or sulfids into ferric oxid or red oxid of iron of character sufficiently porous to be permeable by liquid. When this product has sufficiently cooled, it is to be placed in suitable receptacles—for example, the well-known chlorinating-barrels—and there treated in the usual way with water charged with chlorin or bromin for extraction of gold, or it is to be transferred to lixiviation-vats of well-known forms of construction and there leached with solution of alkali-metal cyanid, so obtaining the gold or gold and silver in aqueous solution, to be recovered therefrom by the customary methods.

Having thus described my process, what I claim as new and of my own invention, and what I desire to secure by Letters Patent, is—

1. The process herein described which consists in mixing pulverized auriferous magnetite with pulverized auriferous pyrite and subjecting the mixture to heat without the oxidizing action of air, substantially as described.

2. The process herein described which consists in mixing pulverized auriferous magnetite with pulverized auriferous pyrite and subjecting the mixture to heat without the oxidizing action of air and afterward subjecting the mass to heat with access and oxidizing action of air, substantially as described.

3. The process herein described which consists in mixing pulverized auriferous magnetite with pulverized auriferous pyrite and subjecting the mixture to heat without the oxidizing action of air and afterward subjecting the mass to heat with access and oxidizing action of air and subsequently subjecting the cooled mass to lixiviation with water containing chlorin or bromin or a suitable cyanid, substantially as described.

EDWARD D. KENDALL.

In presence of—
  GEO. E. CRUSE,
  JOS. P. MCELDUFF.